United States Patent Office 3,186,853
Patented June 1, 1965

3,186,853
METHOD OF PROCESSING MEAT
Jerome A. Meusel, Baltimore, Md., assignor to The Baltimore Spice Company, Baltimore, Md., a corporation of Maryland
No Drawing. Filed Sept. 3, 1964, Ser. No. 394,325
2 Claims. (Cl. 99—159)

This application is a continuation-in-part of my co-pending application Serial No. 195,008, filed May 15, 1962, and now abandoned.

This invention relates to seasoning, curing, and pickling of meats, fowl, and fish and to edible foodstuffs manufactured therefrom and particularly to means providing for the identification of seasonings, cures, and pickling compositions utilized in the processing of foodstuffs in accordance with the present invention.

In the preparation of seasoned foodstuffs on a commercial scale a large number of spices and seasonings are added to the meat, fish, or fowl being processed, or to the cure or pickle liquor with which the foodstuff is sometimes treated. Even with the most careful proportioning and blending it is a not uncommon occurrence that some one flavor or curing effect predominates or is lacking in the final product to an undesirable extent, possibly because of segregation or uneven distribution of the seasoning throughout the foodstuff or because of improper usage or substitution. For these reasons, or others, a more or less average percentage of processed foodstuffs are returned to the food processor as defective or unsatisfactory by the purchaser.

Usually the food processor has no recourse except to reimburse the purchasers although in many instances, he is not at all certain that the allegedly unsatisfactory products originated from him at all. As a consequence, from the standpoint of the food processor, it would be very desirable to be able to identify the foodstuffs originating at his plant in some non-toxic and inconspicuous manner.

Briefly, the present invention comprises the addition of small but significant amounts of maltol to the seasonings, cures, or pickling compositions used in the processing of edible foodstuffs being processed, whereby the resulting products may be readily distinguished from similar foodstuffs to which maltol has not been added. By incorporating the maltol in suitable amounts and at appropriate stages in the processing, foodstuffs are produced which may be readily identified as those to which maltol has been added.

Specifically, it has been found that by incorporating maltol into seasonings, cures, or meat pickles for food products, in various amounts such that from 0.25 to 2.5 parts per million of maltol remains in the finished food product, the desired identification can be obtained.

The following are formulas for seasonings, meat pickles, and other meat curing ingredients as examples of food components to which maltol has been added so that the desired amount of maltol results in the finished food product.

Chicken seasoning (for chicken broth, chicken rice soup, chicken noodle soup, chicken Brunswick stew, chicken pie, chicken gravy, etc.)

| | | |
|---|---|---|
| Monosodium glutamate | pounds | 20 |
| Dextrose | do | 30 |
| Onion powder | do | 3 |
| Ground white pepper | pound | 1 |
| Ground celery seed | do | 1 |
| Salt | pounds | 45 |
| Maltol | ounce | .08 |

Directions: Use 8 oz. of above seasoning to 100 lbs. of chicken product.

Frankfurter seasoning

| | | |
|---|---|---|
| Ground coriander | pounds | 67 |
| Ground nutmeg | do | 15 |
| Ground white pepper | do | 10 |
| Ground paprika | do | 5 |
| Ground ginger | do | 2 |
| Ground cardamom | pound | 1 |
| Maltol | ounce | .32 |

Directions: Use 8 oz. of above seasoning to 100 lbs. of frankfurter product.

Pork sausage seasoning

| | | |
|---|---|---|
| Salt | pounds | 60 |
| Cane sugar | do | 15 |
| Rubbed sage | do | 10 |
| Ground black pepper | do | 10 |
| Ground ginger | do | 3 |
| Ground marjoram | pound | 1 |
| Ground thyme | do | 1 |
| Maltol | ounce | .16 |

Directions: Use 2 lbs. of above seasoning to 100 lbs. of pork sausage.

Meat loaf seasoning

| | | |
|---|---|---|
| Dextrose | pounds | 98 |
| Oleoresin of black pepper | pound | 1 |
| Oleoresin of paprika | ounces | 2 |
| Oil of cloves | do | 8 |
| Oil of pimenta berries | do | 4 |
| Oil of cinnamon | do | 2 |
| Maltol | ounce | .16 |

Directions: Use 8 oz. of above seasoning to 100 lbs. of meat loaf.

Pumping or cover pickle cure

| | | |
|---|---|---|
| Salt | pounds | 86 |
| Sodium nitrite | do | 6 |
| Sodium nitrate | do | 4 |
| Maltol | pound | .045 |

Directions: Use according to the following formula.

| | | |
|---|---|---|
| Water | gallons | 50 |
| Salt | pounds | 75 |
| Sugar | do | 15 |
| Cure as above | do | 15 |

Pump hams 10% of green weight.

Phosphate compound for pumping pickle

| | | |
|---|---|---|
| Sodium acid pyrophosphate | pounds | 40 |
| Tetra sodium pyrophosphate | do | 40 |
| Sodium tripolyphosphate | do | 20 |
| Maltol | pound | .05 |

Directions: Use 2 to 6 oz. per gallon of pickle.

As indicated above, it is highly desirable to be able to identify the food products after they have left the control of the food processor and entered into channels of trade, since complaints are received from time to time from customers that a seasoning, cure, meat pickle, or the like has been responsible for the production of an unsatisfactory product. Usually, there is no means of determining whether the specific products which have been used, originated with a specific food processor, or a specific supplier of the seasoning, cure, or pickle, or if they did, whether they have been used in the proper amounts according to instructions.

Various types of invisible markers are employed by manufacturers for the purposes of identification but they have certain disadvantages. Some are easily detected by odor and flavor. Others, are toxic or are not approved as food additives under the Additives Amendment to the Food, Drug and Cosmetic Act. Still others are not sufficiently sensitive to be able to positively identify the seasoning, cure, meat pickle, etc. in the finished product.

One important aspect of the present invention is that it provides a means whereby seasonings and the like can be identified in a finished food product easily and positively even at great dilutions.

As indicated in the formulations above, maltol is added to seasonings and pickle cures in amounts which will result in traces being present in the finished food product and which are not toxic and do not impart an objectionable flavor or odor to the food. Amounts in the range of 0.25 part per million or more are satisfactory, and may be readily detected in the edible product.

The above amounts are not to be confused with the presently used amounts of maltol when it is used as a flavorant or to enhance flavors in foodstuffs. In such instances the maltol is usually added as a separate addition and in amounts of from 30 to 3300 parts per million of food, upwards of 100 p.p.m. being the amounts usually employed, the addition of maltol being such as to provide between 0.25 and 2.5 parts per million of maltol in the foodstuff and between 50 and 500 parts per million of maltol in the additive to be incorporated into the foodstuff.

The identification of maltol in the food product is achieved as follows:

A sample of the seasoning, cure, meat pickle, finished food product, etc. is extracted using distilled water. A minimum amount of water is used so that slightly more than 20 milliliters of extract is obtained.

Two 10 milliliter sample portions are taken of the extract and 10 milliliters of distilled water is added to one and 2 milliliters of 2 N sodium hydroxide and 8 milliliters of ferric ammonium sulfate solution are added to the other. The ferric ammonium sulfate solution is prepared by weighing 20 grams of $FeNH_4(SO_4)_2 \cdot 12H_2O$ into a 2 liter flask and adding 500 milliliters of distilled water and then 45 milliliters of concentrated sulfuric acid. The reagent is then diluted to 2 liters with distilled water.

Even though the extract of seasoning, cure, meat pickle or finished food may be colored, in most cases a difference in color between the extract of the sample without ferric ammonium sulfate and the sample with ferric ammonium sulfate is immediately apparent.

If there is no apparent difference in color, the samples of extract are transferred to cuvettes with a 1 centimeter light path and the light absorbency is determined at 520 millimicrons in a Model DB Beckman Spectrophotometer or similar instrument. Any increase in the absorbency at this wavelength in the sample with the ferric ammonium sulfate solution as compared to the sample without the ferric ammonium sulfate solution, indicates the presence of maltol and this indicates the presence of the marked seasoning, cure, or meat pickle, and hence identifies the seasoning, cure, or meat pickle.

By developing appropriate spectrophotometric curves for maltol for various amounts of maltol originally introduced into the seasoning, cure or meat pickle, it is possible to determine in the finished food product whether the seasoning, cure or pickle had been used in the amount recommended to the food processor or whether the finished food product was deficient or contained an excess of the seasoning.

Maltol is available as a dry, white fine powder and is sufficiently soluble that it is readily taken up in seasoning or cures of the type described. Maltol is also known as the compound represented by the formula

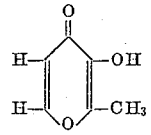

Having now described the invention in its preferred aspects, it is not intended that it be limited except as required by the appended claims.

I claim:

1. In the seasoning of meat products formed from comminuted meats, the improvement which permits identification of the source of the seasoning incorporated in the comminuted meat product which improvement consists in incorporating into the seasoning an amount of maltol and incorporating said maltol-containing seasoning into the comminuted meat in an amount such that the amount of maltol imparted to the seasoned meat product is substantially below an amount which suffices to impart a noticeable maltol flavor to said meat product and which constitutes between about 0.25 part and 2.5 parts per million of maltol in said meat product.

2. In the curing of meat products the improvement which permits identification of the source of the curing composition used in the curing process which improvement consists in incorporating into the curing composition an amount of maltol and incorporating said curing composition into the meat to be cured, under conditions such that the amount of maltol imparted to the cured meat product is substantially below an amount which suffices to impart a noticeable maltol flavor to said cured product and which constitutes between about 0.25 part and 2.5 parts per million of maltol in said cured product.

References Cited by the Examiner

UNITED STATES PATENTS

| | | | |
|---|---|---|---|
| 2,355,548 | 8/44 | Musher | 99—109 |
| 2,860,995 | 11/58 | Sair | 99—140 X |
| 2,937,094 | 5/60 | Rupp et al. | 99—159 |
| 2,955,041 | 10/60 | Broderick et al. | 99—107 X |
| 3,032,421 | 5/62 | Buchholz | 99—109 |
| 3,156,569 | 11/64 | Griffin et al. | 99—140 |

A. LOUIS MONACELL, *Primary Examiner.*

HYMAN LORD, *Examiner.*